(12) United States Patent
Neitge et al.

(10) Patent No.: US 9,002,170 B2
(45) Date of Patent: Apr. 7, 2015

(54) DUST CAP FOR FIBER OPTIC CABLE OR ADAPTER

(76) Inventors: Dan J. Neitge, Excelsior, MN (US);
Brad S. Morrow, Big Lake, MN (US)

( * ) Notice: Subject to any disclaimer, the term of this patent is extended or adjusted under 35 U.S.C. 154(b) by 69 days.

(21) Appl. No.: 13/567,677

(22) Filed: Aug. 6, 2012

(65) Prior Publication Data

US 2013/0034349 A1   Feb. 7, 2013

Related U.S. Application Data

(60) Provisional application No. 61/514,944, filed on Aug. 4, 2011.

(51) Int. Cl.
*G02B 6/00* (2006.01)
*G02B 6/44* (2006.01)

(52) U.S. Cl.
CPC ..................................... *G02B 6/443* (2013.01)

(58) Field of Classification Search
USPC .......................................................... 385/139
See application file for complete search history.

(56) References Cited

U.S. PATENT DOCUMENTS

| | | | |
|---|---|---|---|
| 6,095,851 A | 8/2000 | Laity et al. | |
| 6,227,717 B1 | 5/2001 | Ott et al. | |
| 6,554,485 B1 | 4/2003 | Beatty et al. | |
| 6,534,798 B1 | 10/2003 | Cheng | |
| 6,712,524 B2 | 3/2004 | Beatty et al. | |
| 7,194,183 B2 | 3/2007 | Thornton et al. | |
| 7,565,053 B2 | 7/2009 | Zimmel et al. | |
| 7,572,066 B2 | 8/2009 | de Jong et al. | |
| 7,670,170 B2 | 3/2010 | Henry et al. | |
| 7,706,657 B1 | 4/2010 | McQuiggan | |
| 7,708,586 B1 | 5/2010 | Rohde et al. | |
| 7,945,139 B2 | 5/2011 | Parkman, III et al. | |
| 2003/0002810 A1 | 1/2003 | Cheng | |
| 2004/0218872 A1 | 11/2004 | Low | |
| 2005/0220434 A1 | 10/2005 | Hsieh | |
| 2007/0217749 A1 | 9/2007 | Jong et al. | |
| 2008/0310795 A1 | 12/2008 | Parkman, III et al. | |
| 2009/0280677 A1 | 11/2009 | Gingrich, III | |
| 2010/0074588 A1 | 3/2010 | Zimmel et al. | |

OTHER PUBLICATIONS

PCT Search Report dated Jan. 22, 2013 for PCT Application No. PCT/US2012/049477 filed Aug. 3, 2012, 9 pages.

*Primary Examiner* — Eric Wong
*Assistant Examiner* — Erin Chiem
(74) *Attorney, Agent, or Firm* — Antonio Papageorgiou, Esq.; Meister Seelig & Fein LLP

(57) ABSTRACT

A dust cap adapted to fit over a fiber optic adapter. The dust cap includes a dust cap body having a light-entering end and an opposite indicating end. The dust cap body is shaped such that the light-entering end has an interference fit with the fiber optic adapter. A first gap-creating projection extends from the light-entering end, and a second gap-creating projection extends from the light-entering end. The dust cap also includes a light pipe running along a longitudinal axis of the dust cap body from just beyond the light-entering end to just beyond the indicating end.

16 Claims, 2 Drawing Sheets

DUST CAP FOR FIBER OPTIC CABLE OR ADAPTER

RELATED APPLICATION

The present application claims the benefit of U.S. Provisional Application No. 61/514,944 filed Aug. 4, 2011, which is incorporated herein in its entirety by reference.

FIELD OF THE INVENTION

The present invention relates generally to dust caps, and more particularly, to fiber optic dust caps for port identification.

BACKGROUND OF THE INVENTION

Fiber optic applications using optical fiber connectors and adapters often require the identification of specific optical fibers during installation, interconnection, and maintenance testing. For example, referring to FIG. 1, the typical fiber run for a user utilizing a fiber optic connection might extend from a source or central office to a cross box, from the cross box to a curbside access terminal, and finally from the curbside access terminal into the user's home or office. Within such a system, connections of the optical fibers between the various intermediaries are typically accomplished through the use of fiber adapters mounted within patch panels, cabinets, or racks. Each of the panels, cabinets, or racks typically includes a large number of optical connector adapters or ports all aligned along a densely packed interface in which fiber connectors can be coupled. Thus, because of the sheer number of cables and the small area in which the cables are packed, as well as the distances and interconnections required of fiber optic applications, the problem of uniquely identifying specific connectors becomes clear. Further, as patch panels become increasingly smaller and, in turn, fiber optic cabling becomes increasingly more densely packed, effective identification of individual fibers becomes increasingly more important.

When a specific connector of a panel is needed for interconnection with another connector, visible light from a visual fault locator (VFL) is used to perform optical fiber tracing for connector identification. For example, in the illustration provided in FIG. 1, a technician working in the user's home, attempting to diagnose a cabling or connection problem, can apply the VFL to the terminus of the fiber optic connector. The VFL emits a bright beam of laser light into the fiber via the terminus to send light throughout the length of cable and any subsequently connected cable. Another technician located at the source or central office can then see a visual indication via visible light on a particular port at the central office to thereby discover the corresponding source port. Of course, this process can be replicated for any subset of the fiber run in order to identify subsets of cabling. For example, a technician may wish to identify the cabling subset from the curbside access terminal back to only the cross box. In such a case, the VFL can be applied from the curbside access terminal for visual indication at the cross box.

Dust caps are used to prevent the optical fiber adapters and connectors used in fiber optic applications from being contaminated by dirt, dust, and other particles, as well as to prevent contact with objects that can scratch, chip, crack, or otherwise physically damage the polished core of the fiber. To do so, dust caps typically engage fiber adapters such that the entire adapter is covered. Dust caps are traditionally made of opaque plastic materials, such as, for example, low-density polyethylene materials. Because of the opaqueness of the cover and total coverage over the adapter when engaged, it is impossible to detect the light from a VFL without removing the dust cap. As a result, for panels having a large plurality of ports, the technician attempting to identify a particular cable and associated port must remove many dust caps in order to find the visible light. Not only is removing many dust caps tedious, but removing the dust cap can be risky, as the opportunity for eye damage exists if light is directly viewed through the fiber. Further, removing and replacing dust caps can create an opportunity for dust and other contaminants to reach the polished end of the fiber.

To combat some of these problems, certain dust caps having translucent bodies have been devised. The light from a VFL is introduced to the back side of the translucent dust cap via the connected fiber, which subsequently flows through the body of the cap and into view of the observant technician through the walls of the body. However, such dust caps generally have a dull glow, which can often be difficult to identify in brightly lit environments.

Thus, there remains a need for a fiber optic dust cap that provides for the safe, effective identification of individual fiber optic fibers via a piercing, yet harmless, visual indication without needless removal of the dust cap.

SUMMARY OF THE INVENTION

The device of the present application substantially meets the aforementioned needs of the industry. The present invention provides embodiments of a dust cap such that an end visible to a technician or user is brightly illuminable by a VFL emitting light through the corresponding fibers in order to identify specific optical fibers.

The dust cap of embodiments of the present invention allows for the identification of specific optical fibers without removing the dust cap. Thus, the tedious procedure of removing a plurality or all of the dust caps on a panel in order to identify the visible light is avoided. Further, by preserving the fit of the dust cap such that the entire adapter is covered, without the added step of removing and replacing the cap, the opportunity for dust and other contaminants to reach the polished end of the fiber is eliminated. Additionally, and perhaps most importantly, no opportunity for eye damage exists because the light entering the connector side of the cap is diffused through the body of the cap by means of an air gap and diffusing light pipe running the length of the cap such that when light appears at the indicating end, it is bright but not harmful.

Another feature and advantage of embodiments of the present invention is that the indicating light at the indicating end is piercing and bright, not dull. The light further appears much larger than the actual diameter of the light pipe. As such, it is readily apparent even in the brightest environments.

Another feature and advantage of embodiments of the present invention is that perfect light pipe alignment is unnecessary. The light pipe is designed to receive and transmit light effectively such that a perfectly parallel and abutting relationship between the received light and the light pipe is not required. Such a design aids tremendously in manufacturing. For example, lower tolerance requirements of the relationship between the dust cap body and the light pipe angle reduce manufacturing costs because more assembled caps will be acceptable. Thus, fewer dust caps will be scrapped.

Another feature and advantage of embodiments of the present invention is that the dust cap provides two mechanisms for diffusing light. First, an air gap is created by projections at the light-entering end. Light is diffused in the air prior to the reception of the light by the light pipe. Second, the light pipe is designed to not transport the emitted light by a VFL as it would with standard light. That is, the material of the light pipe effectively diffuses the light transmitted through the fiber optic cable.

Another feature and advantage of embodiments of the present invention is that the dust cap provides an indication of a light source such that fibers can be identified and traced between multiple crossings. The dust cap of the present invention can be installed along any of the intermediaries of FIG. 1. Thus, when light via a VFL is applied at an appropriate end, the fiber optic cables can be traced throughout multiple crossings.

In an embodiment of the present invention, a dust cap adapted to fit over a fiber optic adapter comprises a dust cap body having a light-entering end and an opposite indicating end, wherein the dust cap body is shaped such that the light-entering end has an interference fit with the fiber optic adapter, a first gap-creating projection extending from a face of the light-entering end, a second gap-creating projection at a second end of the light-entering end, and a light pipe running from just beyond the light-entering end to just beyond the indicating end.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
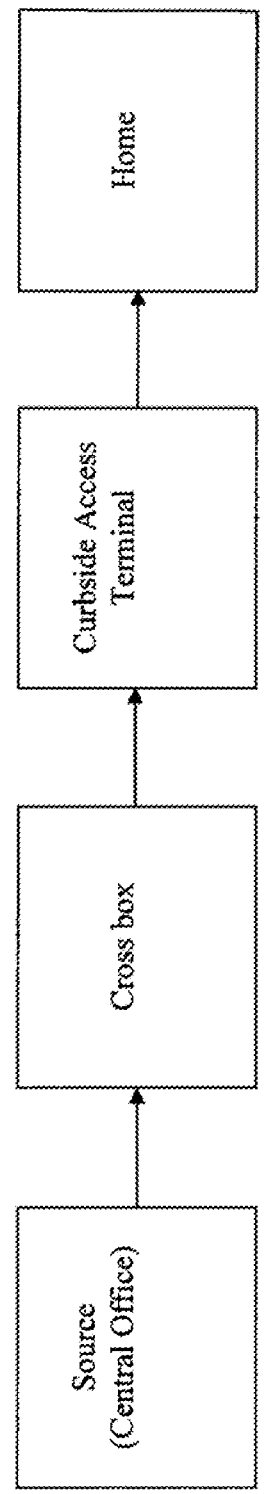
FIG. 1 is a flowchart of a typical fiber optic run.

While the invention is amenable to various modifications and alternative forms, specifics thereof have been shown by way of example in the drawings and will be described in detail. It should be understood, however, that the intention is not to limit the invention to the particular embodiments described but rather to include all modifications, equivalents, and alternatives.

DETAILED DESCRIPTION OF THE DRAWINGS

Figure 2:
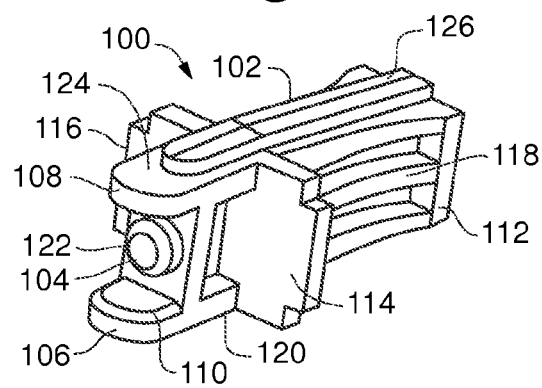
FIG. 2 is a perspective view of a dust cap according to an embodiment of the invention.
Figure 3:
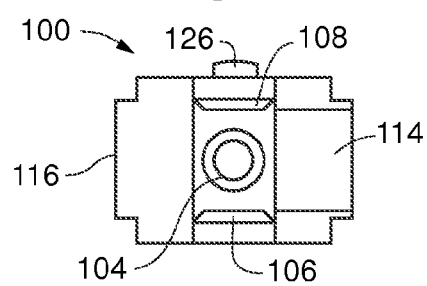
FIG. 3 is a side view of a dust cap according to an embodiment of the invention.
Figure 4:
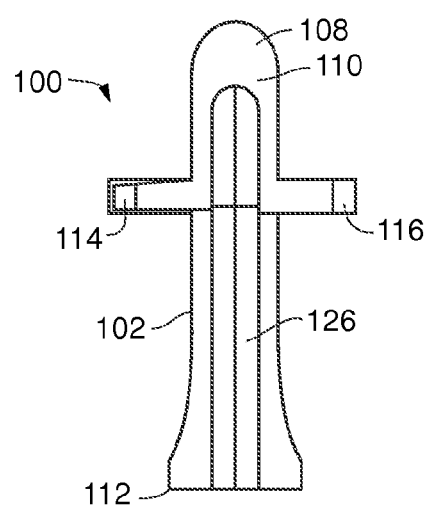
FIG. 4 is a top planform view of a dust cap according to an embodiment of the invention.

In an embodiment, a dust cap of the present invention is shown generally at 100 in FIGS. 2-4. Dust cap 100 generally comprises an elongate dust cap body 102, a light pipe 104 extending along the length of dust cap body 102, a first gap-creating projection 106, and a second gap-creating projection 108. It can be contemplated that dust cap 100 can comprise more or less than first and second gap-creating projections 106, 108.

Dust cap body 102 is substantially rectangular, having a first side 118, a second side 120 adjacent and extending substantially orthogonally from first side 118, third side 122 adjacent and extending substantially orthogonally from second side 120, and fourth side 124 adjacent and extending substantially orthogonally from third side 122 such that fourth side 124 extends to first side 118. Dust cap body 102 has a light-entering end 110 and an indicating end 112 located distal light-entering end 110. First blocking projection 114 extends orthogonally or otherwise (e.g. at an angle) from first side 118 of dust cap body 102. Likewise, second blocking projection 116 extends orthogonally or otherwise (e.g. at an angle) from the opposite side, third side 122 of dust cap body 102. In another embodiment of the present invention, first blocking projection 114 and second blocking projection 116 do not orthogonally project as discretely as in FIG. 2, but instead are encompassed within the bulk of dust cap body 102. Interference ridge 126 projects from fourth side 124 along substantially all of fourth side 124. Interference ridge 126 aids in making contact with a fiber optic adapter when dust cap 100 is installed.

First gap-creating projection 106 extends from light-entering end 110 along dust cap body 102 second side 120. Second gap-creating projection 108 extends from light-entering end 110 along dust cap body 102 fourth side 124 such that second gap-creating projection 108 is substantially parallel to first gap-creating projection 106. First and second gap-creating projections 106 and 108 have substantially the same length and are rounded at their respective distal ends. In other embodiments, first and second gap-creating projections 106 and 108 can extend from portions of dust cap body 102 other than second side 120 and fourth side 124, for example, first side 118 and third side 122, respectively. In other embodiments, a single or greater-than-two plurality of gap-creating projections are utilized.

It should be understood that alternative dust cap body designs are considered. For example, a dust cap body according to embodiments of the invention can have more or less than four sidewalls such that the dust cap body can be substantially cylindrical, substantially rounded, substantially oblong (e.g. single-sided having circular or oval cross-sections), or can be triangular, squared, or the like, having any of a number of polygonal cross-sections. In yet other embodiments of the invention, the dust cap can have portions of the body larger than others such that the body tapers from one end to the other, e.g. frustoconical. Similarly, differing shapes of gap-creating portions and blocking projections are also considered.

Dust cap body 102 can be made of any type of thermoplastic elastomer or thermoplastic rubber, for example. In another embodiment, a mix of polymers, typically a plastic polymer and a rubber polymer is considered. Such polymers, which have both thermoplastic and elastomeric properties, aid in manufacturing. In one example, such polymers are easily injection molded. Suitable plastic polymers can comprise, for example, polyethylene (low-density, high density, or low linear), polypropylene, polystyrene, polyvinyl chloride, polyesters such as polyethylene terephthalate, or any of a variety of combinations. In various embodiments, dust cap body 102 can be made of varying colors and densities, according to the desired application.

Figure 5:
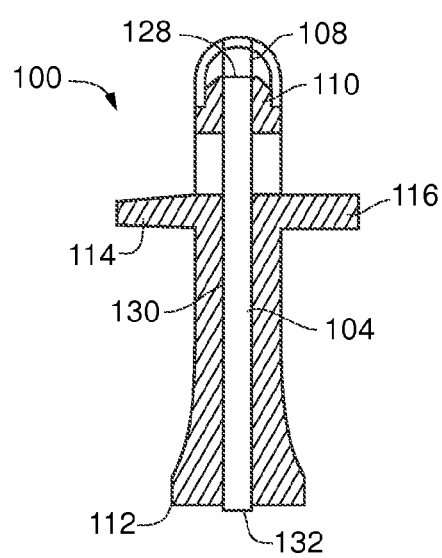
FIG. 5 is a cross-sectional view of a dust cap according to an embodiment of the invention.

Referring specifically to FIG. 5, dust cap 100 has light pipe 104 extending along the length or a longitudinal axis of dust cap body 102. Light pipe 104 includes light pipe body 130, receiving extension 128, and displaying extension 132. Receiving extension 128 projects just beyond dust cap body 102 at light-entering end 110. Light pipe body 130 then runs from receiving extension 128 through dust cap body 102 to displaying extension 132 at indicating end 112. Displaying extension 132 projects such that it is even with or just beyond dust cap body 102 at indicating end 112. In certain embodiments, displaying extension 132 can indicate even if displaying extension 132 is slightly inside the end of indicating end 112 of dust cap body 102, if displaying extension 132 is not completely obstructed by dust cap body 102.

Light pipe 104 can be made of any number of glass or plastic materials. In an embodiment, an ornamental plastic fiber comprises light pipe 104. In other embodiments, light pipe can comprise any material having characteristics of transparent to non-transparent, or foggy to clear material, for example. Shards of plastic throughout dust cap body 102 can also be utilized as light pipe 104. The above-listed examples are not intended to be a limiting, as light pipe 104 can comprise any material that effectively reflects and displays light. Light pipe 104 is not sensitive to the material of dust cap body 102, allowing for use of light pipe 104 in a myriad of fiber optic applications.

In an embodiment, light pipe 104 diameter can vary according to the application and environment. For example, where dust cap body 102 has a larger body, larger light pipe 104 diameters can be utilized, if desired. In a brighter surrounding environment, a larger light pipe 104 can be useful to illuminate a larger displaying extension 132 to make the illumination of each dust cap 100 more visible. Conversely, where dust cap body 102 has a smaller body, smaller light pipe 104 diameters can be utilized. Therefore, differing diameters of light pipe 104 are considered.

In operation, dust cap 100 is fitted over an optical fiber adapter along a fiber optic run. Interference ridge 126 and the width of dust cap body 102 from second side 120 to fourth side 124 provide an interference fit with the receiving end of the optical fiber adapter. Dust cap 100 is inserted into the optical fiber adapter such that first gap-creating projection 106 and second gap-creating projection 108 make flush contact with the back walls of the optical fiber adapter. Because of the extensions of first and second gap-creating projections 106 and 108 away from light pipe 104 and specifically, receiving extension 128, an air gap is created by the clearance between the end of the attached fiber optic cable and light pipe 104.

When installed, first blocking projection 114 and second blocking projection 116 create barriers to prevent or reduce contaminants from contacting the polished core of the fiber, as well as to preventing any contact with objects that can scratch, chip, crack, or otherwise physically damage the polished core. By running flush with the exterior of the optical fiber adapter, first and second blocking projections 114 and 116 create a cover that encloses the attached fiber cable inside the optical fiber adapter and dust cap 100.

A technician wishing to identify a particular length of fiber optic cable or particular optical fiber port along the run of fiber where dust cap 100 is installed uses a VFL to emit a bright beam of laser light into the terminus of the first cable. By operation of the interconnectivity of the first cable with connected cables throughout any number of multiple crossings, light is transmitted throughout the first cable and any subsequently connected cable.

The transmitted light is reflected out of the cable attached to the optical fiber adapter with dust cap 100 installed and diffused through the air gap created by first and second gap-creating projections 106 and 108. The diffused light is received by receiving extension 128 of light pipe 104 once it travels through the air gap. The diffused light is further diffused along light pipe body 130 from light-entering end 110 to indicating end 112 until it reaches displaying extension 132. Displaying extension 132 is consequently illuminated by the transmitted light in a safe, yet piercingly bright manner. A second technician located where dust cap 100 is installed is then able to view the visible light at indicating end 112 by the illumination of displaying extension 132. The two technicians can then clearly and appropriately identify which fiber optic cables are connected to which other cables, and at which ports, without removing individual dust caps.

It is understood that in other embodiments, alternative dust cap designs are contemplated in order to accommodate a myriad o fiber optic connector adapters. For example, adapters including, but not limited to, SC, LC, MTP, MU, ST, D4, and MTP (MPO), are considered.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A dust cap adapted to fit over a fiber optic adapter, the dust cap comprising:
    an elongate dust cap body having a light-entering end and an opposite indicating end, wherein the dust cap body is shaped such that the light-entering end is adapted to create an interference fit with the fiber optic adapter;
    at least one gap-creating projection extending from the light-entering end; and
    a light pipe running from about the light-entering end to about the indicating end, the light pipe comprising:
    a receiving extension located proximate the light-entering end;
    a displaying extension located proximate the indicating end; and
    a light pipe body running from the receiving extension to the displaying extension.

2. The dust cap of claim 1, wherein the at least one gap-creating projection creates an air gap between the end of the fiber optic adapter and a light pipe.

3. The dust cap of claim 2, further comprising:
    at least one gap-creating projection projecting from the dust cap body and adapted to prevent light from transmitting beyond the air gap; and
    at least one blocking projection adapted to prevent contaminants from contacting the fiber optic.

4. The dust cap of claim 1, wherein the receiving extension projects beyond the light-entering end.

5. The dust cap of claim 1, wherein the displaying extension projects beyond the indicating end.

6. The dust cap of claim 1, wherein the displaying extension projects flush with the indicating end.

7. The dust cap of claim 1, wherein the displaying extension runs slightly inside the indicating end.

8. The dust cap of claim 1, further comprising a light pipe, wherein the light pipe comprises at least one of glass or plastic.

9. The dust cap of claim 1, further comprising an interference ridge projecting from the dust cap body and adapted to make contact with the fiber optic adapter.

10. The dust cap of claim 1, wherein the dust cap body is made of at least one of thermoplastic elastomer, thermoplastic rubber, or plastic polymer.

11. The dust cap of claim 10, wherein the plastic polymer comprises one of low-density polyethylene, high-density polyethylene, low-linear polyethylene, polypropylene, polystyrene, polyvinyl chloride, or polyester.

12. A method of identifying optical fibers along a fiber optic run, the fiber optic run including a first fiber optic cable operably coupled to a second fiber optic cable, the method comprising:
fitting a dust cap over an optical fiber adapter of the first fiber optic cable, the dust cap comprising an illuminable indicating end and a light pipe running from about the light-entering end to about the indicating end, the light pipe comprising a receiving extension located proximate the light-entering end, a displaying extension located proximate the indicating end, and a light pipe body running from the receiving extension to the displaying extension; and
emitting a beam of laser light into a terminus of the second fiber optic cable, thereby illuminating the indicating end of the dust cap at the first fiber optic cable so as to associate the first fiber optic cable with the second fiber optic cable.

13. The method of claim 12, further comprising associating the operably coupled port of the first fiber optic cable with the operably coupled port of the second fiber optic cable.

14. The method of claim 12, wherein the fiber optic run comprises a third fiber optic cable operably coupled to the first fiber optic cable, and the method further comprises:
fitting a second dust cap over an optical fiber adapter of the third fiber optic cable, the second dust cap comprising an illuminable indicating end; and
illuminating the indicating end of the second dust cap at the third fiber optic cable to associate the third fiber optic cable with the second fiber optic cable.

15. The method of claim 12, wherein the illuminated indicating end comprises an end of a light pipe, and viewing the illuminated indicating end of the dust cap includes viewing a diameter of light that appears larger than the diameter of the light pipe.

16. A dust cap adapted to fit over a fiber optic adapter, the dust cap comprising:
an elongate dust cap body having a light-entering end and an opposite indicating end, wherein the dust cap body is shaped such that the light-entering end is adapted to create an interference fit with the fiber optic adapter;
at least one gap-creating projection extending from the light-entering end; and
a light pipe running from about the light-entering end to about the indicating end, the light pipe comprising:
a displaying extension located proximate the indicating end; and
a light pipe body running from the light-entering end to the displaying extension.

* * * * *